United States Patent

[11] 3,549,142

[72] Inventor John B. Tilton
Hudson, Ohio
[21] Appl. No. 779,841
[22] Filed Nov. 29, 1968
[45] Patented Dec. 22, 1970
[73] Assignee The Goodyear Tire & Rubber Company
Akron, Ohio
a corporation of Ohio

[54] FLUID SPRINGS
42 Claims, 14 Drawing Figs.
[52] U.S. Cl. ................................................. 267/65,
92/103
[51] Int. Cl. ................................................. F16f 9/04,
F01b 19/00
[50] Field of Search ........................................ 92/103, 34,
35, 42, 47, 93; 267/122, 65A, 65B, 65, (Inquired);
138/121, 122, 30, (Inquired); 103/148; 230/169

[56] References Cited
UNITED STATES PATENTS

| | | | |
|---|---|---|---|
| 2,360,590 | 10/1944 | Schweller ..................... | 138/30 |
| 2,582,249 | 1/1952 | Hendel ......................... | 138/121X |
| 2,830,622 | 4/1958 | Roberts et al. ................ | 138/121X |
| 2,922,637 | 1/1960 | Bowser et al. ................ | 92/103X |
| 2,999,681 | 9/1961 | Muller et al. ................. | 267/65 |
| 3,058,493 | 10/1962 | Muller .......................... | 138/122 |
| 3,063,732 | 11/1962 | Harbers et al. ............... | 267/65X |
| 3,081,075 | 3/1963 | Selman ......................... | 267/65 |
| 3,186,438 | 6/1965 | Holmgren ..................... | 138/121 |
| 3,255,677 | 6/1966 | Hesse ........................... | 92/92 |

FOREIGN PATENTS

| | | | |
|---|---|---|---|
| 348,423 | 10/1956 | Switzerland ................... | 267/65A |
| 788,973 | 1/1958 | Great Britain ................ | 267/65 |
| 1,063,427 | 8/1959 | Germany ....................... | 267/65 |
| 1,150,889 | 6/1963 | Germany ....................... | 267/65 |

*Primary Examiner*—Martin P. Schwadron
*Assistant Examiner*—Leslie J. Payne
*Attorneys*—F. W. Brunner and Ronald P. Yaist ABSTRACT: A fluid spring of the type used in a fluid pressure system which includes a flexible resilient member having an improved construction to facilitate its overall operation in the system and increase its flex life. The flexible member has a hollow body of fabric-reinforced elastomeric material which includes (1) one or more circumferential depressions adjacent to a bead ring in at least one of its peripheral ends to provide hinge points to facilitate its movement during the operation of the spring, and/or (2) a plurality of closely spaced corrugations in at least the area of the member which is subjected to dynamic contact with elements of the system to facilitate its flexing while in service. The invention is particularly useful in vehicle suspension systems, and its teachings may be applied to both bellows and piston type springs, or also to any combination thereof.

3,549,142

INVENTOR.
JOHN B. TILTON

ATTORNEY

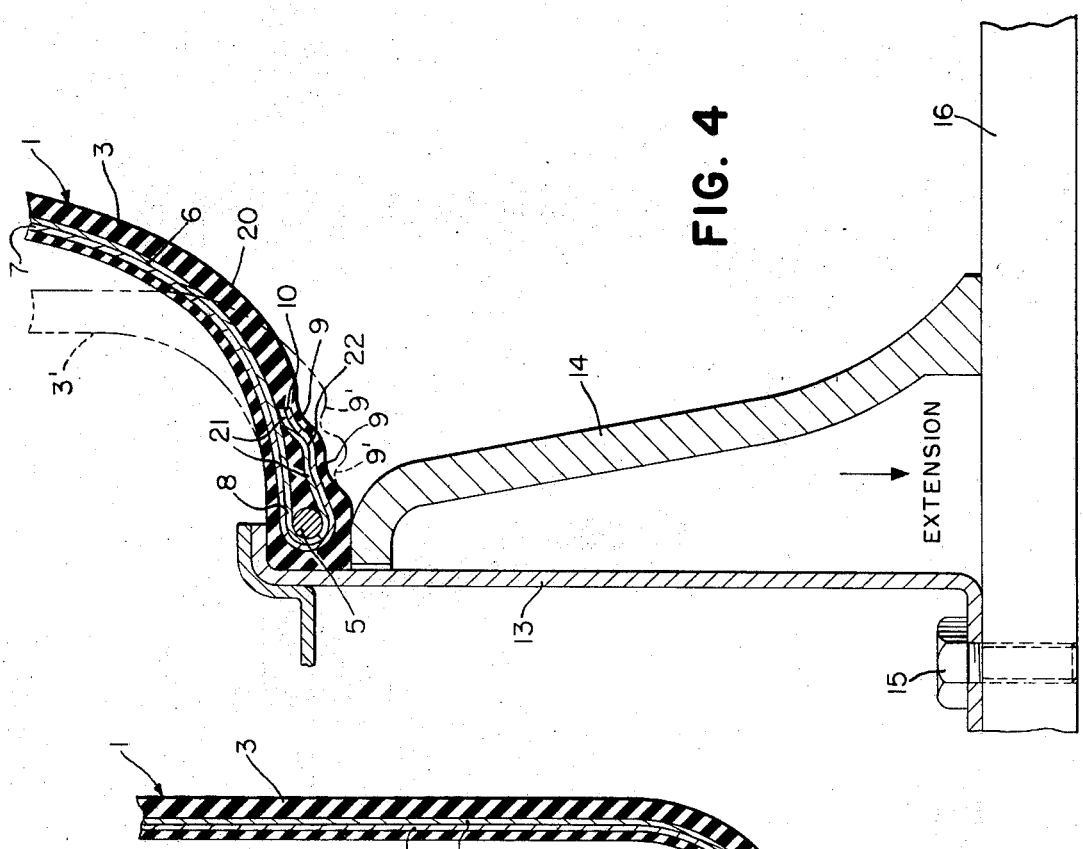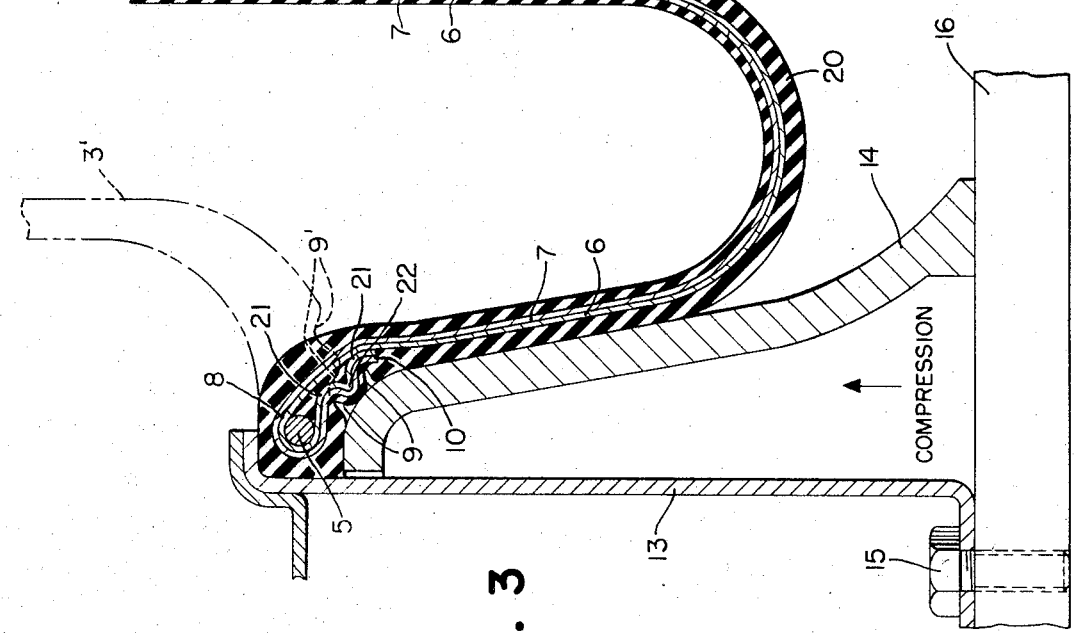

INVENTOR.
JOHN B. TILTON
BY
ATTORNEY

INVENTOR.
JOHN B. TILTON
BY
ATTORNEY

INVENTOR.
JOHN B. TILTON

3,549,142

INVENTOR.
JOHN B. TILTON

FLUID SPRINGS

BACKGROUND OF THE INVENTION

This invention relates to improvements in fluid springs, such as pneumatic or air springs of the type used in fluid pressure systems. More specifically, this invention relates to improvements in the construction of the flexible resilient member of these springs to improve their overall operability and flex life. This invention has particular application to the so-called rolling lobe air spring or to the combination of a bellows and rolling lobe air spring in which the flexible member is subject to rather severe flexing during the operation of the spring.

Pneumatic or air springs are normally employed for shock absorbing, load supporting and vibration isolation in vehicle suspension systems and other industrial and military applications. In the typical fluid pressure system, a flexible resilient member having a hollow body of fabric-reinforced elastomeric material, such as rubber or the like, is positioned between and attached to retaining elements to form an airtight chamber capable of supporting a load. Customarily, an essentially inextensible bead containing a circumferential retaining wire or bead ring is formed at each of the peripheral ends of the member to create a compression seal on the retaining elements. The bead rings function to maintain the shape of the member and prevent its undue expansion while being inflated. The retaining elements are adapted for movement relative to each other to cause the configuration of the flexible member to change with such movement thereby resulting in a change of the pressure of the fluid contained in the chamber. This compression and expansion of the column of fluid contained in the chamber occurs during what is known as the deflection cycle of the spring which includes the compression and extension or rebound strokes.

As indicated in the article entitled, "Air Springs", by A. B. Hirtreiter, published in the Apr. 1, 1965, issue of Machine Design Magazine, on pages 104 through 117, air springs may be generally classified into two groups; namely, the bellows type and the piston type. In the piston type spring the force is applied by a piston which is normally attached to one end of the flexible member. In one such spring, the reversible diaphragm spring, the piston head usually passes through to the opposite end of the flexible member. In another piston type spring, the reversible sleeve type, the piston head travels within the flexible member and does not pass through the opposite end thereof. There are many variations of the reversible sleeve type piston spring, such as the reversible sleeve rolling lobe, the restrained rolling lobe, the laterally restrained rolling lobe, the fully supported sleeve, the hydropneumatic spring and the shock absorber sleeve.

The operation of the piston type spring may be exemplified by reference to the reversible sleeve rolling lobe spring. In this particular spring, the fabric cord reinforcement is at such an angle that the flexible member wall assumes a cylindrical shape of a predetermined diameter when the spring is inflated. This generally tubular flexible member is positioned between retaining elements by means of the annular beads located at each of the ends thereof. When a reciprocating means, such as a piston, moves within the member, the retaining elements move relative to one another and a rolling motion is created in the toroidal loop portions of the wall of the member with the resulting change of configuration of the member consequently changing the pressure of the fluid confined in the chamber. An excellent detailed description of the construction, operation, and production of the rolling lobe type air spring is contained in Hirtreiter, U.S. Pat. No. 3,043,582.

Those skilled in the art are aware that the rather severe flexing to which these springs are subjected often leads to the premature failure of this article of manufacture in service. The areas of the flexible member which are most susceptible to these failures are (1) the area immediately adjacent to the bead ring known as the bead or fabric turnover portion which is formed by the fabric layers passing around the bead ring, and (2) the area of the body of the flexible member which is subjected to dynamic contact with the piston or retaining elements during the movement of the member. For the purposes of this specification, by the term "dynamic contact" is meant not only the ordinary contact which occurs between the elastomeric material of the member and any other element of the system but also the contact therebetween which may be described as rolling, rubbing, squirming, or sliding engagement. It is, therefore, desirable to increase the flex life of these springs by facilitating the flexing to which the flexible members are subjected.

A further problem, particularly encountered when the piston type spring is being used, for instance, in a vehicle suspension system, is the entrapment of road dust or other foreign matter which is lodged between the outer surface of the wall of the member and the surface of the piston. During the movement of the flexible member, this foreign matter eventually may abrade the sidewalls of the flexible member and cause premature failure to occur.

The present invention provides a spring construction designed to reduce or eliminate these before-mentioned problems. One form of the invention provides at least one circumferential depression adjacent to the bead ring and particularly with regard to the piston type spring in at least the fabric turnover portion at that end of the flexible member which comes in contact with the piston. The depression or depressions provide a hinge point to facilitate the movement of the flexible member. These depressions penetrate the elastomeric material and create an indentation in each of the fabric layers which tends to straighten upon rebound during the movement of the member thereby relieving the resulting stresses created in the turnover portion. With regard to the piston type springs, each depression provides a hinge point which enables the flexible member to more closely conform to the contour of the piston and thereby the entrapment of abrading foreign material is prevented or substantially reduced.

In another form of the invention, a plurality of closely spaced corrugations are placed in at least the area of the outer surface of the flexible member which is subjected to dynamic contact with the piston or retaining elements during the movement of the member. Thereby the thickness of the body of the member is reduced at definite intervals to further facilitate the flexing thereof. For example, in regard to the piston type spring this area is where the flexible member comes in rolling engagement with the piston and in the bellows type where the flexible member contacts the retaining structure during its operation in a fluid pressure system.

The teachings of this invention may be used in regard to both the bellows and piston type springs, or also in any combination thereof. It is also desirable in many applications to combine the two forms of the invention and provide both the circumferential depression and the closely spaced corrugations to improve the overall operability of the particular spring.

THE OBJECTS OF THE INVENTION

It is an object of this invention to provide a fluid spring construction which increases the flex life of the flexible resilient member of the spring.

It is another object of this invention to provide a fluid spring construction which facilitates the flexing of the flexible member of the spring and relieves the stresses created therein during its operation in a fluid pressure system.

It is still another object of this invention to provide a pneumatic spring construction for a vehicle suspension system which will prevent the entrapment and accumulation of foreign particles between the outer surface of the flexible member and the surface of a reciprocating means, such as a piston, by permitting the member to more closely follow the contour of the piston during its operation in such system.

Other objects and advantages of this invention will become apparent hereinafter as the description thereof proceeds, the novel features, arrangements and combinations being clearly pointed out in the specification as well as the claims thereunto appended.

BRIEF DESCRIPTION OF THE DRAWINGS

In the drawings:

FIG. 3 is an enlarged fragmentary view more clearly indicating the feature of the invention shown in FIG. 2;

FIG. 4 is an enlarged fragmentary view similar to FIG. 3 showing a portion of the member during the rebound or extension stroke of its deflection cycle;

DESCRIPTION OF THE PREFERRED EMBODIMENTS

Figure 1:
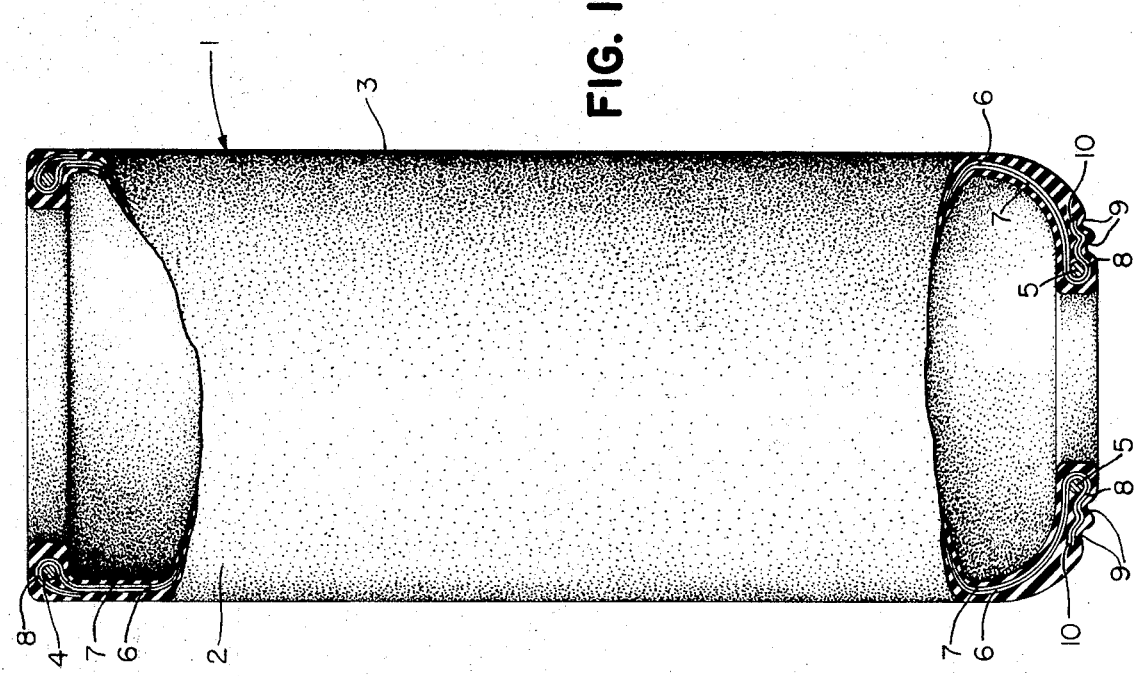
FIG. 1 is an elevational view shown partly in section of the flexible member of one type of fluid spring in its molded condition illustrating one feature of this invention.

In FIG. 1 the flexible resilient member 1 including one of the features of this invention is shown which in this instance is the reversible sleeve-type, rolling lobe air spring. The member 1 is shown as molded, for instance, in the presence of heat and pressure in a customary manner well known in the art. The flexible member 1 is a hollow container having a body 2 in the form of a generally tubular sleeve with a wall 3 which tapers to a bullet shape at one end and an annular metal ring or bead ring 4 and 5 at each peripheral end thereof. The bead rings 4 and 5 may also be in the form of multiple turns of a wire strand, instead of a ring. The member 1 is composed of rubber or other elastomeric material reinforced with textile fabric, such as nylon or polyester. The fabric layers 6 and 7 pass around the bead rings 4 and 5 and form a bead or fabric turnover portion 8 immediately adjacent thereto.

Since the fabric turnover portion 8 includes two layers of fabric surrounding the bead rings 4 and 5 or twice the number of fabric layers as contained in the remainder of the body 2 of the member 1, it is the stiffest or most difficultly flexed portion. Therefore, circumferential grooves or depressions 9, for instance, of a substantially U-shape when molded are provided adjacent to the bead ring 5 and, preferably, within the fabric turnover portion 8 itself as shown. Although the specific shape of each depression 9 is largely immaterial, it is, of course, vital that they be positioned adjacent to the bead ring 5 at the small bead end of the member 1, which is the end that comes in contact with the piston while in service. Each depression 9 provides a hinge point to facilitate the movement of the member 1 during its operation in a fluid pressure system. It has been found that the ultimate ease of movement is achieved when the fabric turnover endings 10 terminate in one of the depressions 9 and, preferably, this should be the depression 9 furthermost from the bead ring 5.

This hinge point is particularly important in current rolling lobe air-spring constructions in which the bead rings are permanently bonded to the rubber and fabric material surrounding them. This arrangement necessarily results in a much stiffer member than in designs in which the bead ring is free floating, that is, a bead ring which is free of the rubber and fabric.

Figure 2:
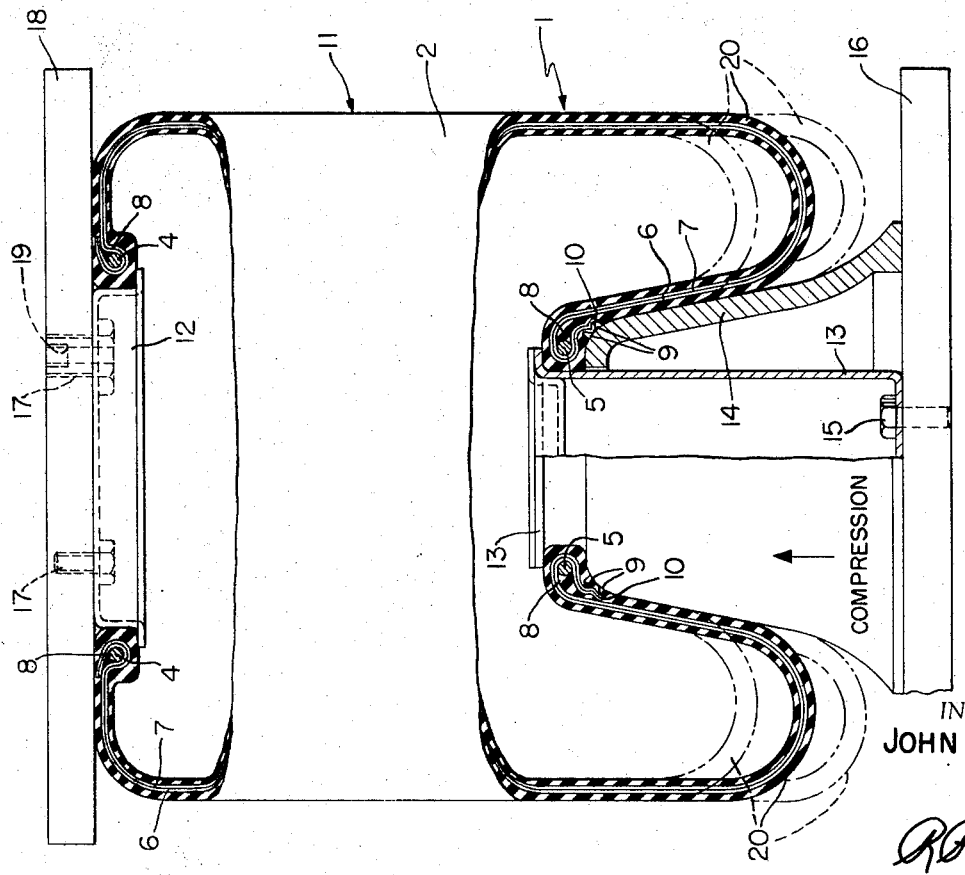
FIG. 2 is an elevational view shown partly in section of the flexible member of FIG. 1 in its normal operating or design position, during the compression stroke of its deflection cycle in a fluid pressure system.

The flexible member 1 as inflated in operation under load is shown in FIG. 2 in the typical rolling lobe air-spring assembly 11 which is normally employed in a vehicle suspension system. As illustrated, the member 1 is placed between the upper metal retaining element 12 and the lower metal retaining element 13 and attached thereto by means of the beads 8 which provide a mounting means at each end of the member 1. The beads 8 also create a compression seal on the retaining elements 12 and 13, to form an air-receiving chamber and the bead rings 4 and 5 function to maintain the shape of the member 1 and prevent its undue expansion while being inflated. The lower retaining element 13 fits into a bell-shaped piston 14 in the form of a cylindrical metallic member and is secured by means of bottom mounting studs 15 to a bottom end plate 16 which, for example, may be the axle pad of a vehicle. The upper retaining element 12 is similarly secured by means of top mounting studs 17 to the upper end plate 18 which may be, for example, the vehicle frame. The upper retaining element 18 also includes an air fitting 19 included within one of the studs 17 to allow inflation and deflation of the member 1.

When the piston 14 travels within the flexible member 1, the elements 12 and 13 move relative to each other and change the configuration of the member 1 by creating a rolling motion in the toroidal loop or so-called rolling lobe portion 20 of the wall 3 of the member 1 in the direction of the movement which is shown in broken lines. The column of air or other fluid contained in the chamber of the member 1 is compressed and expanded by the reciprocating action of the piston 14 and thereby is able to support a load, such as a vehicle body. The generally bullet shape of the member 1 at the small bead end enables the wall 3 to conform more readily to the contour of the piston 14 as it travels within the member 1. Alternately, when the fluid is a liquid, and consequently largely incompressible, it acts as a pressure transfer medium to balance the load between, for example, the front and rear vehicle suspensions by compensating for pressure changes which may occur. Those skilled in the art are aware that this can be accomplished, for instance, by means of an accumulator located in the fluid pressure system.

The function and design of the depressions 9 of this invention are best seen in FIGS. 3 and 4. The circumferential depressions 9 are normally molded into the bead or fabric turnover portion 8 during vulcanization and penetrate the elastomeric material creating an indentation 21 in each of the fabric layers 6 and 7. The fabric layers 6 and 7 generally follow the contour of the depressions 9 and, therefore, include a raised portion 22 which is created between the depressions 9. The number of depressions necessary will depend upon the particular application with usually one or two being sufficient, however, in many applications more than two depressions may be needed to achieve the best results. The size of the depressions naturally will vary depending upon the thickness of that portion of the body of the member into which the depressions are to be placed. However, it has been discovered that as a general rule the width of each depression at its widest point should be about 6 to 8 times its depth and the depth of each depression should be from about 33⅓ percent to about 50 percent of the total thickness of the area into which it is placed. Typical dimensions for each depression of a member having a bead area or fabric turnover thickness of about 0.340 of an inch is a width of about 0.560 of an inch and a depth of about 0.090 of an inch. It is desirable when forming the depressions to maintain about 0.025 of an inch vulcanized elastomeric cover thickness to prevent any penetration of the fabric layer.

In FIG. 3, the lobe 20 is shown in a normal operating or design position approximately at an intermediate point during the compression stroke of the member 1. In this position the depressions 9 tend to close in order to provide hinge points so that the lobe portion 20 of the wall 3 of the member 1 may much more readily follow the contour of the bell-shaped piston 14. In this way, the entrapment of road dust or other foreign matter which may become lodged between the outer surface of the wall 3 of the member 1 and the surface of the piston 14 is prevented or substantially reduced. As the toroidal loop or lobe 20 moves down the piston 14 to its lowest point in the compression stroke, the depressions 9 remain at the same relative position as when the lobe 20 is in its design or intermediate position. For illustrative purposes, the molded or uninflated contour of the wall 3 of the flexible member 1 is shown in broken lines and represented by numeral 3', and the depressions 9 as molded are also shown in broken lines and indicated by numeral 9'.

The position of the lobe 20 during the rebound or extension stroke is shown in FIG. 4. In this position, the depressions 9 are opened to the maximum extent and the indentations 21 and raised portion 22 of the fabric layers 6 and 7 tend to straighten from their previous position, as shown in FIG. 3, thus relieving the stresses in the fabric turnover portion 8 and allowing the member 1 to flex more freely on rebound. In this way, the life of the spring is appreciably prolonged. Again, the molded contour of the wall 3 of the member 1 and depressions 9 are shown in broken lines and represented by numerals 3' and 9', respectively.

Figure 5:
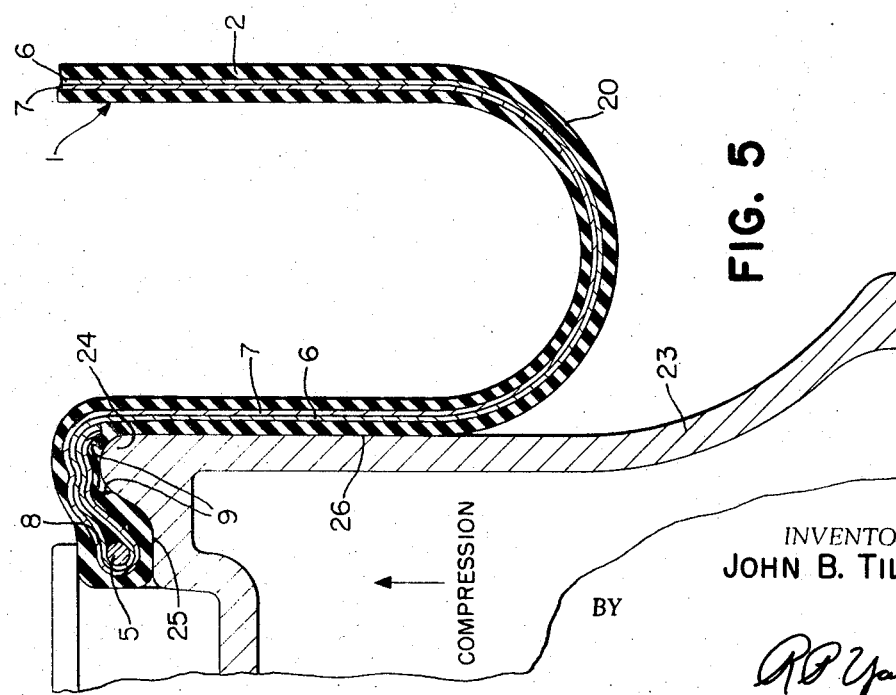
FIG. 5 is a modification of the invention shown in FIG. 3.

Of course, many piston contours are possible, depending upon the particular application, and the exact location of the depressions should be determined largely by the particular piston shape. For example, in the modification shown in FIG. 5, the piston 23 is of the straight-walled recessed type having an accented, raised shoulder portion 24 adjacent to the pocketlike recess 25 into which the bead ring 5 and bead 8 are placed. In this case, the depressions 9 are provided in the portion of the body 2 of the member 1 which must negotiate the raised shoulder portion 24 of the piston 23 and also conform to the contour of the straight wall portion 26 during the operation of the spring. The member 1 is here illustrated in its design position while under compression. As previously mentioned, it is here again preferable to provide the depressions 9 in the bead or fabric turnover portion 8 of the member 1.

Figure 6:
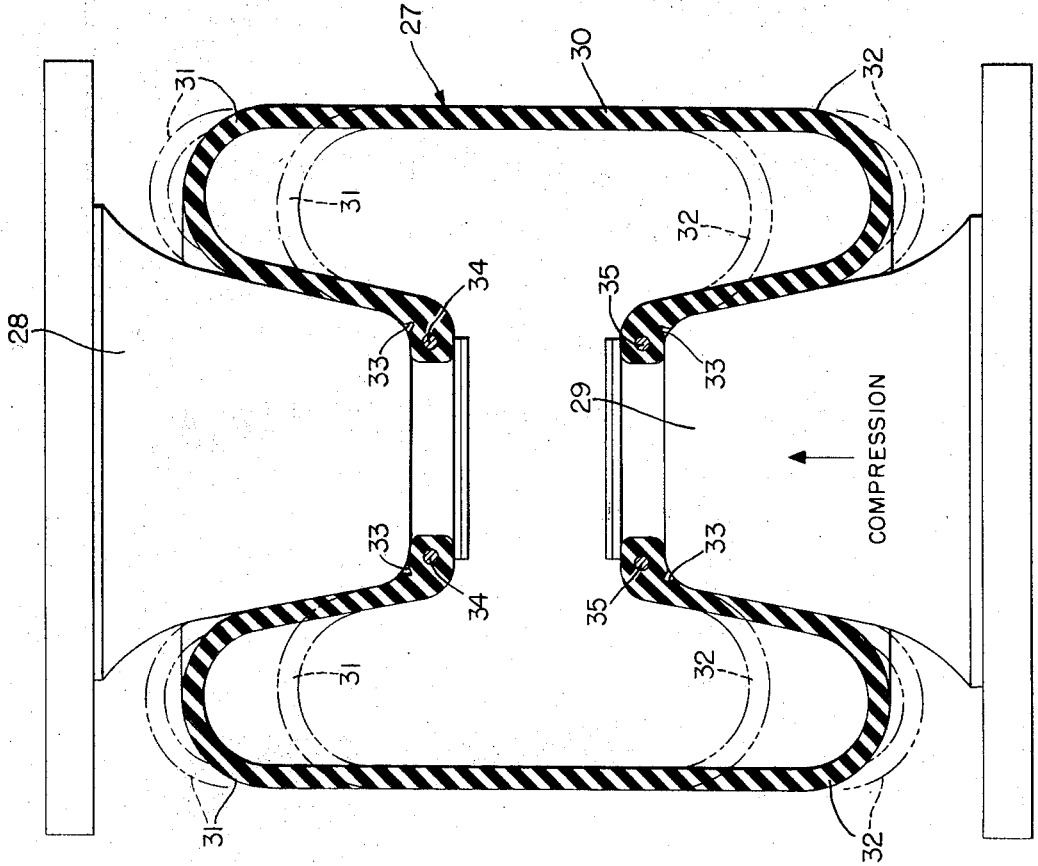
FIG. 6 is a modification of the invention shown in FIG. 2.

It may also be appropriate in some instances to provide depressions in both fabric turnover portions in either end of the member, for instance, as in the fluid spring assembly 27 of FIG. 6 in which bell-shaped pistons 28 and 29 act at both ends of the flexible member 30. The assembly 27 is shown in its design position and the toroidal loops or lobes 31 and 32 (with the rolling motion represented in broken lines) are accordingly created at each end of the member 30 and the depressions 33 provided adjacent to the bead rings 34 and 35 allow the lobes 31 and 32, respectively, to follow the contour of their respective pistons 28 and 29 in the same manner as if only a single piston were being employed. It should be noted also in regard to this particular arrangement, the rolling action may also occur with respect to one piston only or with respect to the other only. The depressions 9 are particularly important to this construction because of the tendency of dirt or other harmful substances to remain locked when the lobe 31 rolls against the piston 28.

Figure 7:
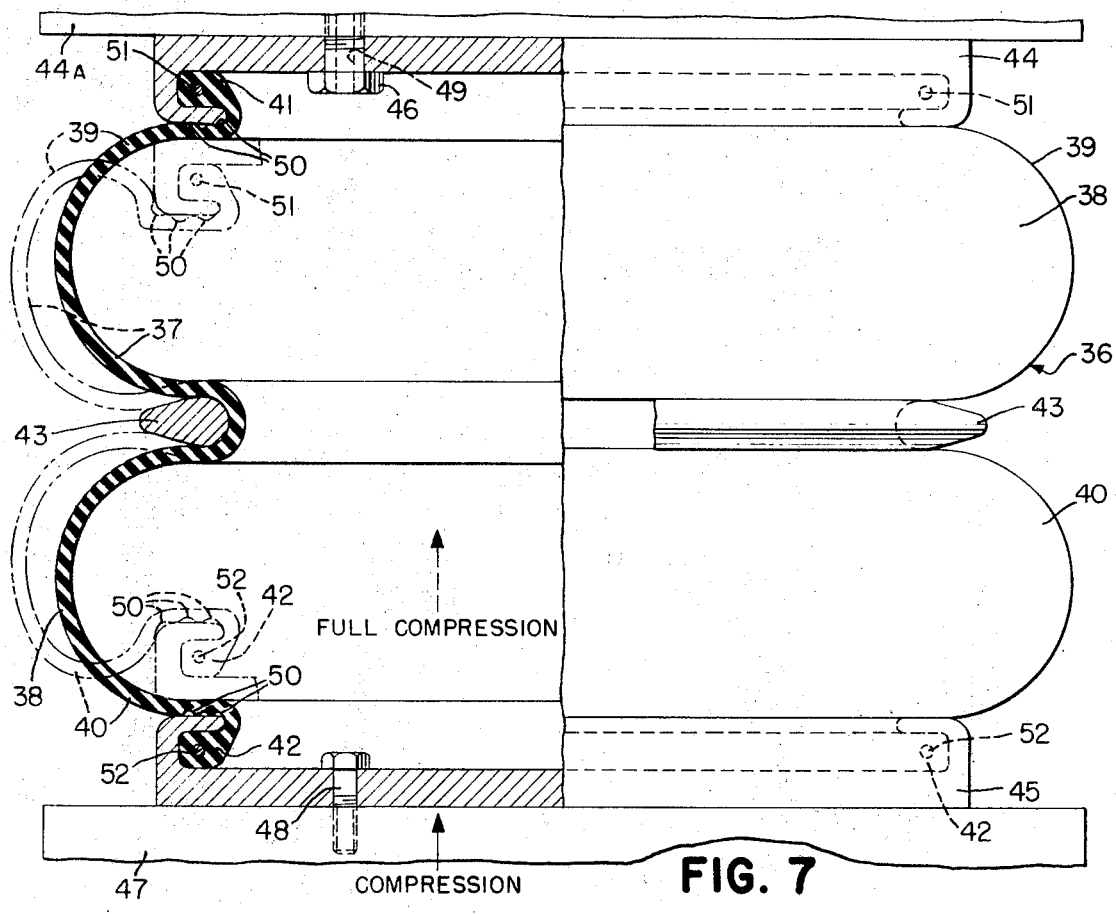
FIG. 7 is a modification of the invention shown in FIG. 2 illustrating another type of spring for which the invention is useful.

The grooves or depressions of this invention are also useful in providing hinge points for the bellows-type fluid springs, such as shown in FIG. 7 in its design position. In the fluid spring assembly 36 of this example, a flexible member 37 has a body 38 which includes two bellows lobes 39 and 40 having generally toroidal shapes with essentially inextensible bead rings 41 and 42 at each of the ends thereof. A metal retaining ring 43, commonly referred to as a girdle ring, is positioned between the lobes 39 and 40 around the body 38 to hold the central portion of the flexible member 37 in place during the operation of the spring assembly 36. The member 37 is attached to the upper angular retaining element 44 and lower angular retaining element 45 by means of the beads 41 and 42, respectively, in a manner well known in the art. The upper retaining element 44 is attached to the upper end plate 44A by means of the mounting studs 46 and the lower retaining element 45 is similarly attached to the lower end plate 47 by means of mounting studs 48. The air-fitting valve 49 provides a means to inflate and deflate the member.

In this spring assembly, the depressions 50 are placed adjacent the bead rings 51 and 52 in the portion of each lobe 39 and 40 which must move or bend around an angle of the retaining elements 44 and 45 during the operation of the spring. The result when the member 37 is subjected to full compression is shown in broken lines in FIG. 7. As can be seen, when this occurs, the lobes 39 and 40 travel around the corners of the retaining elements 44 and 45, respectively, and the depressions 50 tend to close, thus becoming hinge points to facilitate the movement that takes place.

The member 31 in the bellows-type spring assembly 36 can be subjected to both vertical and lateral load unlike the piston-type spring which is ordinarily subjected only to vertical load. It may, therefore, be appropriate to mold as many as three depressions 50 into the portion of the member 37 adjacent to the bead rings 51 and 52. This portion may or may not be the bead or fabric turnover portion 41 and 42, depending on the design of the particular spring.

Figure 8:
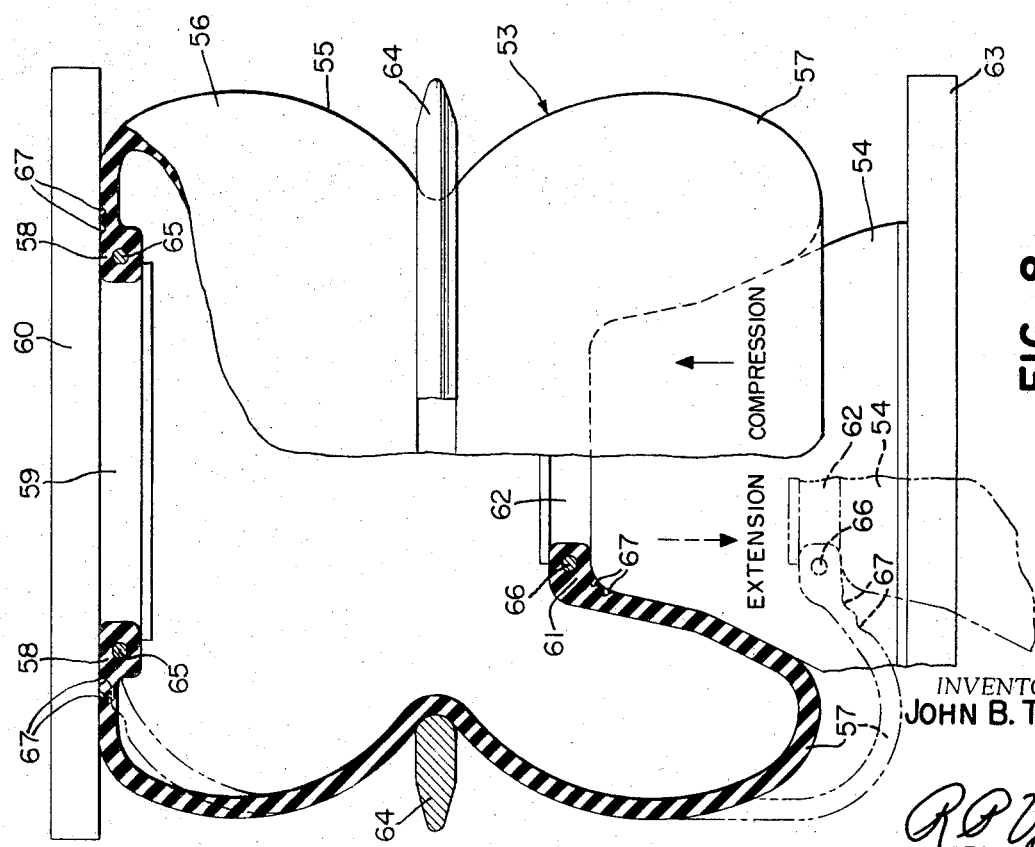
FIG. 8 is a further modification of the invention shown in FIG. 2 illustrating still another type of fluid spring for which this invention is useful.

Another useful application of this invention is in regard to the combination of a piston and bellows spring which is a relatively new development. In FIG. 8 the combination assembly 53 under load in its design position is shown in which a modified bell-shaped piston 54 travels within the flexible member 55. The upper portion of the flexible member 55 is in the form of a bellows lobe 56 of generally toroidal shape and the lower portion is in the form of the typical rolling lobe tubular sleeve or toroidal loop 57. The upper bead 58 at one end of the member provides a compression seal on the upper retaining element 59 which is in turn attached to the upper end plate 60 in the customary manner, as previously described. The lower bead 61 provides a compression seal on the lower retaining element 62 which is attached to the lower end plate 63, according to established procedures. A retaining ring 64 holds the central portion of the member 55 in place during the operation of the combination spring 53. Circumferential depressions 67 are provided adjacent to the bead rings 65 and 66 and, preferably, in the bead or fabric turnover portions 58 and 61, respectively, at each end of the member 55. The depressions 67 adjacent to the bead ring 66 act in the usual manner to provide hinge points which allow the toroidal loop or rolling lobe portion 57 of the member 55 to conform to the contour of the piston 54 and facilitates the flexing of the rolling lobe 57. This is explained previously with regard to FIGS. 2, 3, and 4. Similarly, the depressions 67 adjacent to the bead ring 65 in the bellows lobe portion 56 of the member 55 facilitates flexing of this portion when it contacts the upper end plate 60 during the operation of the spring assembly 53. This is mainly accomplished by permitting the fabric reinforcement to straighten during the rebound or extension cycle, as represented in broken lines in FIG. 8.

In another form of the invention, designed to further facilitate the flexing of a fluid spring, a plurality of relatively closely spaced convolutions or corrugations are placed in at least the area of the outer surface of the flexible member which is subjected to dynamic contact with the elements of the fluid pressure system during its operation. The corrugations are, preferably, uniformly placed either circumferentially, helically, or even sinuously over the outer surface of the member. In this way, the thickness of the body of the member is reduced at spaced intervals, thus providing for a uniform distribution of stresses so that the flexing of the member can be effectively controlled during the compression and rebound strokes of the deflection cycle.

The corrugations are preferably molded into the outer surface of the body of the member during the vulcanization process but can also be formed in other manners well known in the art, for example, by grinding. They may be of various shapes with their placement being the critical feature, rather than the particular configuration or contour of each corrugation, for instance, the corrugations may be generally U-shaped or have an essentially rectangular cross section. The dimensions of the corrugations may also vary greatly, depending upon the overall thickness of the wall of the member. The pitch and depth of corrugations are dependent mainly upon the elastomeric cover thickness of the flexible member. It has been determined that very satisfactory results are obtained if the pitch length between corrugations is about 2 times the depth of each corrugation and if the depth of each corrugation is from about 50 percent to about 80 percent of the vulcanized cover thickness. In a typical example, a plurality of U-shaped grooves having a depth of about one-sixteenth or 0.063 of an inch and a pitch length of about ⅛ or 0.125 of an inch are provided in the outer surface of a flexible member having a sidewall thickness of about 0.187 of an inch, with an outer elastomeric vulcanized cover thickness of about 0.100 of an inch. There is no particular need to make the corrugations so deep as to create an indentation in the textile fabric layers as is the case with the circumferential depressions. The corrugations can be utilized to advantage in both the piston and bellows-type springs, as will be hereinafter illustrated.

Figure 9:
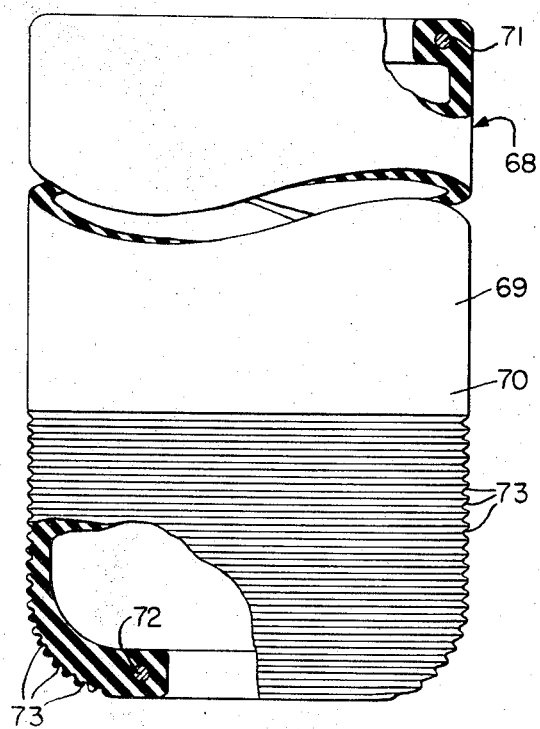
FIG. 9 is an elevational view shown partly in section of the flexible member of the type shown in FIG. 1 illustrating another feature of this invention.
Figure 10:
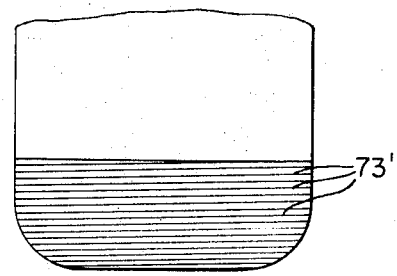
FIG. 10 is a modification of the invention shown in FIG. 9.
Figure 11:
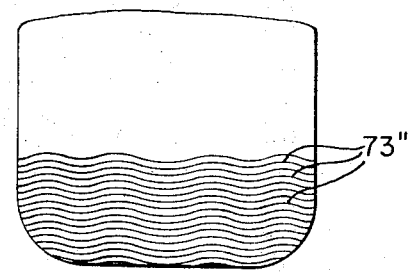
FIG. 11 is another modification of the invention shown in FIG. 9.

In FIG. 9, a flexible member 68 of the reversible sleeve, rolling lobe type is shown as molded. As in FIG. 1, the member 68 has a body 69 in the form of a generally tubular sleeve of fabric-reinforced elastomeric material with a wall 70 tapering to a bullet shape at one end and an annular bead ring 71 and 72 at each peripheral end thereof. A plurality of closely spaced circumferential corrugations 73 are placed uniformly around the area of the peripheral outer surface of the wall 70 of the member 68 which comes in contact with the piston during the operation of the spring in a fluid pressure system. The corrugations 73 could also be in helical form, as shown in FIG. 10, and represented by numeral 73', or in sinuous form, as shown in FIG. 11, and represented by numeral 73''.

Figure 12:
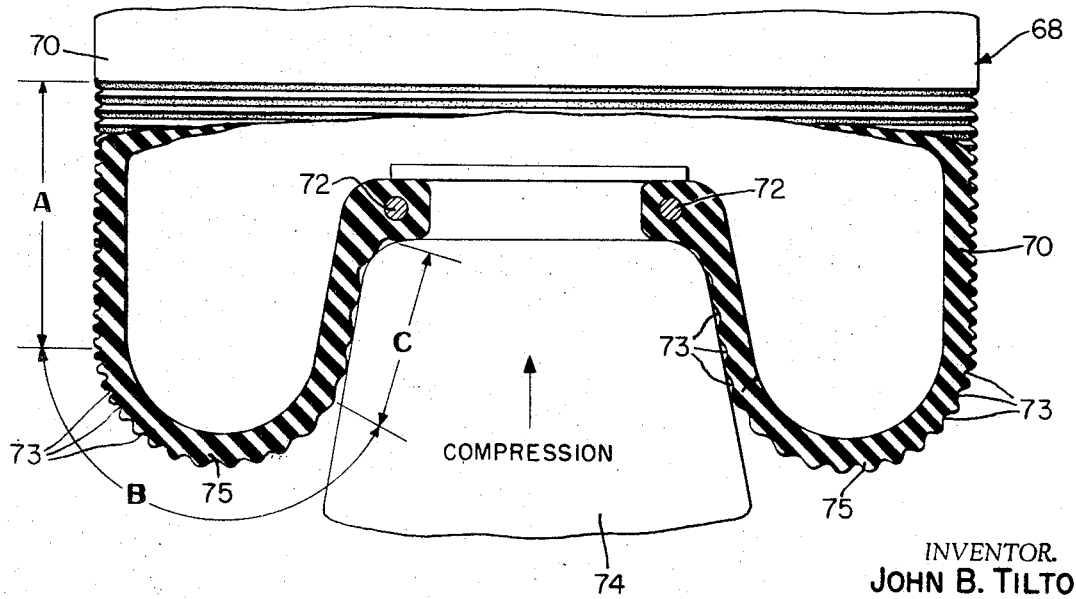
FIG. 12 is a fragmentary elevational view shown partly in section of the flexible member of FIG. 9 in its normal operating or design position during its deflection cycle in a fluid pressure system.

The stress relieving function of the corrugations 73 may be illustrated with reference to FIG. 12, which shows the flexible member 68 of FIG. 9 in its design position in a fluid pressure system. During the compression stroke of its deflection cycle, when the member 68 is acted upon by the piston 74 and the rolling motion is created in the toroidal loop or lobe portion 75 of the member, the contour and pitch of the corrugations 73 may be described in the following manner: 1. in Section A, along the relatively straight wall 70 of the member 68, the corrugations 73 are compressed; 2. in Section B, in the toroidal loop portion 75, the corrugations 73 approach the molded pitch, as shown in FIG. 9; and 3. in Section C, where the toroidal loop portion 75 of member 68 rolls against the piston 74, the corrugations 73 are stretched or extended beyond the molded pitch, as shown in FIG. 9 to alleviate the maximum stresses created in this area.

Figure 13:
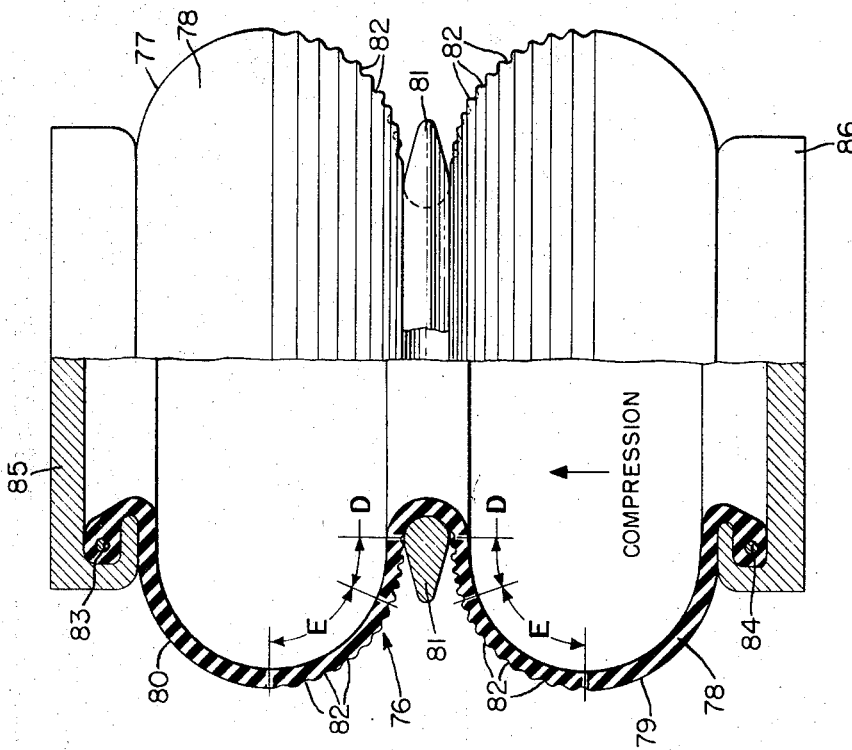
FIG. 13 is a modification of the invention shown in FIG. 12 illustrating another type of fluid spring for which this invention is useful.

FIG. 13 shows a fluid pressure system 76 which employs a bellows-type flexible member 77 illustrated in its design position having a body 78 which includes two toroidal-shaped bellows lobes 79 and 80 and a retaining or girdle ring 81 therebetween. In this embodiment, the corrugations 82 are placed in the outer surface of each lobe 79 and 80 immediately adjacent to the ring 81 since these are the areas of the member 77 which are subjected to the maximum flexing and dynamic contact with elements of the fluid pressure system during the operation of the spring. The corrugations 82 in Section D which contact the ring 81 have basically their molded contour since they are substantially held in place or prevented from extending by the ring 81. The corrugations 82 in Section E which do not directly contact the ring 81 stretch or extend beyond their molded contour with those corrugations 82 at the greatest distance from the ring 81 extending the largest amount. In this way, the flexing of the member 77 is greatly facilitated and its flex life thereby prolonged. It may also be appropriate to extend the corrugations 82 over the entire outer surface of each bellows lobe 79 and 80 since dynamic contact will also occur during full compression when the ends of the bellows member 77 adjacent to the bead rings 83 and 84 move against the upper and lower retaining elements 85 and 86, respectively, as shown in broken lines in FIG. 7.

Figure 14:
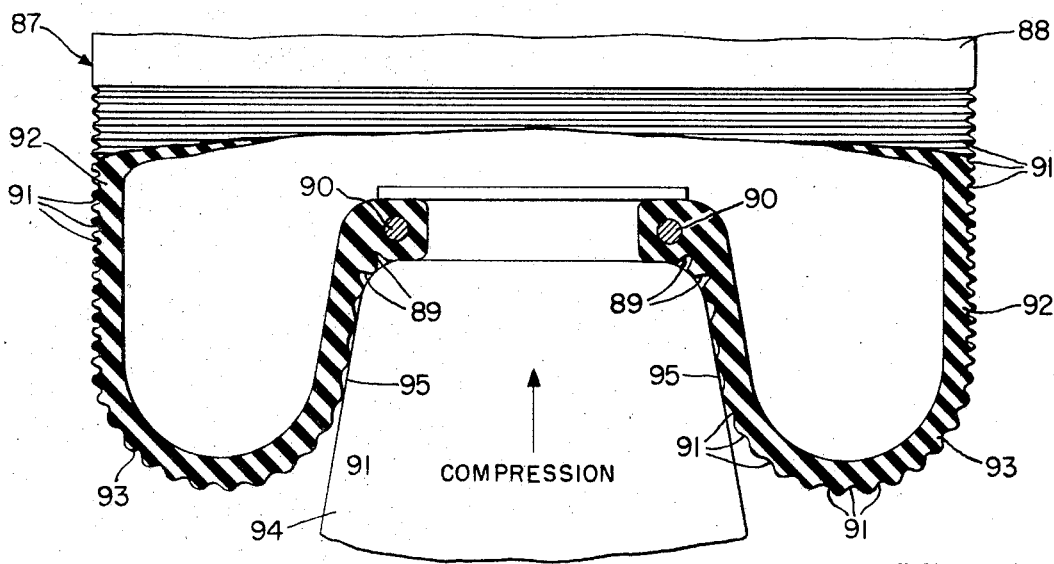
FIG. 14 is a modification of the invention shown in FIGS. 2 and 12 illustrating the combined features of the present invention.

In many applications it may also be desirable to employ both features of this invention. FIG. 14, for example, discloses a fluid spring assembly 87 in its design position in which the flexible member 88 includes both circumferential depressions 89 adjacent the bead ring 90 and a plurality of corrugations 91 in the wall 92 of the member 88. In this way, the lobe portion 93 of the member 88 is able to closely conform to the contour of the piston 94 and also roll more easily against the piston surface 95. Thereby, the flex life of the member 88 will be greatly increased.

It should be understood that although in some instances particular reference is made to pneumatic systems, the principles disclosed in this invention will apply equally to other fluid systems which use various liquids or gases, such as, oil or nitrogen.

While certain representative embodiments and details have been shown for the purpose of illustrating the invention, it will be apparent to those skilled in this art that various changes and modifications may be made therein without departing from the invention.

I claim:

1. A flexible resilient fluid spring member of the type used in a fluid pressure system in which the peripheral end portions of said member are attached to retaining elements to form a fluid-tight chamber capable of supporting a load with said elements adapted for movement relative to each other to cause the configuration of the member to change with such movement thereby resulting in a change of the pressure of the fluid contained in the chamber, said flexible member comprising:
   A. a hollow body of elastomeric material having at least one layer of textile fabric therein and a circumferentially disposed bead area at each of the ends thereof, said body defining at least one toroidal-shaped portion during the operation of the system;
   B. an essentially inextensible circumferential bead ring disposed within said bead area; and
   C. at least one circumferential depression in said body adjacent to said bead ring and spaced from the portion of said bead area that is attached to the retaining elements, each said depression providing a hinge point to facilitate the movement of said flexible member when its configuration is changed by the relative movement of said retaining elements.

2. The member as claimed in claim 1 wherein said body is in the form of a generally tubular sleeve with an annular bead ring at each of the ends thereof and said retaining elements move relative to each other as the result of a reciprocating means which moves within said member causing a rolling motion in the wall of the body in the direction of such movement defining a toroidal loop thereby changing the configuration of said member, and each said depression provides a hinge point enabling the wall to conform to the contour of the reciprocating means thereby preventing the entrapment of abrading foreign material between the wall and the reciprocating means.

3. The member as claimed in claim 2 wherein said member includes a fabric turnover portion immediately adjacent to each said bead ring formed by the fabric layers passing therearound with at least one said turnover portion having at least one said depression therein penetrating the elastomeric material and creating an indentation in each of said fabric layers which tends to straighten during the movement of said member when its configuration is changed thereby relieving the resulting stresses created in said turnover portion.

4. The member as claimed in claim 2 wherein the outer surface of said body includes a plurality of closely spaced corrugations in at least the area thereof subjected to dynamic contact with elements of the system during the movement of said member thereby reducing the thickness of said body at spaced intervals to further facilitate the flexing thereof.

5. The member as claimed in claim 2, wherein the width of each said depression at its widest point is from about 6 to about 8 times greater than its depth, and the depth of each depression is from about 33⅓ percent to about 50 percent of the thickness of the body of the member adjacent said bead ring into which each depression is provided.

6. The member as claimed in claim 1 wherein said body includes at least one bellows having a generally toroidal shape with annular beads at each of the ends thereof.

7. The member as claimed in claim 6 wherein the outer surface of said body includes a plurality of closely spaced corrugations in at least the area thereof subjected to dynamic contact with elements of the system during the movement of said member thereby reducing the thickness of said body at spaced intervals to further facilitate the flexing thereof.

8. The member as claimed in claim 6, wherein the width of each said depression at its widest point is from about 6 to about 8 times greater than its depth, and the depth of each depression is from about 33⅓ percent to about 50 percent of the thickness of the body of the member adjacent said bead ring into which each depression is provided.

9. The member as claimed in claim 1 wherein said body includes a toroidal-shaped bellows in one portion thereof and a generally tubular sleeve in the other portion thereof with annular beads at each of the ends thereof.

10. The member as claimed in claim 9 wherein said member includes a fabric turnover portion immediately adjacent to each said bead ring formed by the fabric layers passing therearound with at least one said turnover portion having at least one said depression therein penetrating the elastomeric material and creating an indentation in each of said fabric layers which tends to straighten during the movement of said member when its configuration is changed thereby relieving the resulting stresses created in said turnover portion.

11. The member as claimed in claim 9 wherein the outer surface of said body includes a plurality of closely spaced corrugations in at least the area thereof subjected to dynamic contact with elements of the system during the movement of said member thereby reducing the thickness of said body at spaced intervals to further facilitate the flexing thereof.

12. The member as claimed in claim 9, wherein the width of each said depression at its widest point is from about 6 to about 8 times greater than its depth, and the depth of each depression is from about 33⅓ percent to about 50 percent of the thickness of the body of the member adjacent said bead ring into which each depression is provided.

13. The member as claimed in claim 1 wherein said member includes a fabric turnover portion immediately adjacent to each said bead ring formed by the fabric layers passing therearound with at least one said turnover portion having at least one said depression therein penetrating the elastomeric material and creating an indentation in each of said fabric layers which tends to straighten during the movement of said member when its configuration is changed thereby relieving the resulting stresses created in said turnover portion.

14. The member as claimed in claim 13, wherein the width of each said depression at its widest point is from about 6 to about 8 times greater than its depth, and the depth of each depression is from about 33⅓ percent to about 50 percent of the thickness of said fabric turnover portion into which each depression is provided.

15. The member as claimed in claim 13, wherein said fabric turnover portion terminates in one of said depressions.

16. The member as claimed in claim 13, wherein at least two spaced depressions are formed creating a raised portion between any two said depressions and said fabric layers generally follow the contour formed by said depressions and raised portions therebetween.

17. The member as claimed in claim 13, wherein said depressions are formed in each said fabric turnover portion.

18. The member as claimed in claim 1, wherein the outer portion of said body includes a plurality of closely spaced corrugations in at least the area thereof subjected to dynamic contact with elements of the system during the movement of said member thereby reducing the thickness of said body at spaced intervals to further facilitate the flexing thereof.

19. The member as claimed in claim 1, wherein the width of each said depression at its widest point is from about 6 to about 8 times greater than its depth, and the depth of each depression is from about 33⅓ percent to about 50 percent of the thickness of the body of the member adjacent said bead ring into which each depression is provided.

20. A flexible, resilient fluid spring member of the type used in a fluid pressure system in which the peripheral end portions of said member are attached to retaining elements to form a fluidtight chamber capable of supporting a load with said elements adapted for movement relative to each other to cause the configuration of the member to change with such movement thereby resulting in a change of the pressure of the fluid contained in the chamber, said flexible member comprising:
A. a hollow body of elastomeric material having fabric reinforcement therein, said body defining at least one toroidal-shaped portion during the operation of the system; and
B. the outer surface of said body including a plurality of closely spaced corrugations in at least the area thereof subjected to dynamic contact with elements of the system during the movement of said member thereby reducing the thickness of said body at spaced intervals to facilitate the flexing thereof.

21. The member as claimed in claim 20 wherein said body is in the form of a generally tubular sleeve with an annular bead ring at each of the ends thereof and said retaining elements move relative to each other as the result of a reciprocating means which moves within said member causing a rolling motion in the wall of the body in the direction of such movement defining a toroidal loop thereby changing the configuration of said member, and said corrugations are positioned in the portion of the outer surface of the wall of the body which contacts the reciprocating means during such movement.

22. The member as claimed in claim 21 wherein the pitch length between each said corrugation is about 2 times the depth of each corrugation and the depth of each said corrugation is from about 50 percent to about 80 percent of the thickness of the outer cover of the elastomeric material.

23. The member as claimed in claim 21, wherein said corrugations extend circumferentially around the peripheral outer surface of said body and are uniformly spaced therein.

24. The member as claimed in claim 21, wherein said corrugations are in helical form around the outer surface of said body and are uniformly spaced therein.

25. The member as claimed in claim 21, wherein said corrugations are in sinuous form around the outer surface of said body and are uniformly spaced therein.

26. The member as claimed in claim 20, wherein said body includes two bellows lobes having generally toroidal shapes with a retaining ring therebetween and the corrugations are positioned in the outer surface of each said bellows immediately adjacent to the ring.

27. The member as claimed in claim 26 wherein the pitch length between each said corrugation is about 2 times the depth of each corrugation and the depth of each said corrugation is from about 50 percent to about 80 percent of the thickness of the outer cover of the elastomeric material.

28. The member as claimed in claim 26, wherein said corrugations extend circumferentially around the peripheral outer surface of said body and are uniformly spaced therein.

29. The member as claimed in claim 26, wherein said corrugations are in helical form around the outer surface of said body and are uniformly spaced therein.

30. The member as claimed in claim 26, wherein said corrugations are in sinuous form around the outer surface of said body and are uniformly spaced therein.

31. The member as claimed in claim 20 wherein said body includes a toroidal-shaped bellows in one portion thereof and a generally tubular sleeve in the other portion thereof with a retaining ring therebetween, and the corrugations are positioned in said bellows immediately adjacent to the ring and in the portion of the outer surface of the wall of the body of the sleeve which contacts elements of the system during the movement of said member.

32. The member as claimed in claim 31 wherein the pitch length between each said corrugation is about 2 times the depth of each corrugation and the depth of each said corrugation is from about 50 percent to about 80 percent of the thickness of the outer cover of the elastomeric material.

33. The member as claimed in claim 31, wherein said corrugations extend circumferentially around the peripheral outer surface of said body and are uniformly spaced therein.

34. The member as claimed in claim 31, wherein said corrugations are in helical form around the outer surface of said body and are uniformly spaced therein.

35. The member as claimed in claim 31, wherein said corrugations are in sinuous form around the outer surface of said body and are uniformly spaced therein.

36. The member as claimed in claim 20 wherein the pitch length between each said corrugation is about 2 times the depth of each corrugation and the depth of each said corrugation is from about 50 percent to about 80 percent of the thickness of the outer cover of the elastomeric material.

37. The member as claimed in claim 20, wherein said corrugations are in sinuous form around the outer surface of said body and are uniformly spaced therein.

38. The member as claimed in claim 20 wherein said corrugations extend circumferentially around the outer peripheral surface of said body and are uniformly spaced therein.

39. The member as claimed in claim 20, wherein said corrugations are in helical form around the outer peripheral surface of said body and are uniformly spaced therein.

40. In a fluid spring of a fluid pressure system including the combination of:
   A. a flexible, resilient member having;
      1. a hollow body of elastomeric material with at least one layer of textile fabric therein and a circumferentially disposed bead area at each of the ends thereof, said body defining at least one toroidal-shaped portion during the operation of the system,
      2. an essentially inextensible circumferential bead ring disposed within said bead area, and
      3. a fabric turnover portion immediately adjacent to each of said bead rings formed by the fabric layers passing therearound;
   B. retaining elements attached to a portion of the bead area at the peripheral edge portions of said member to form a fluidtight chamber capable of supporting a load with said elements adapted for movement relative to each other to cause the configurations of the member to change with such movement thereby resulting in a change of the pressure of the fluid contained in the chamber; and
   C. the improvement comprising, providing at least one said turnover portion with at least one circumferential depression therein spaced from the portion of said bead area that is attached to said retaining elements, each said depression thereby providing a hinge point to facilitate the movement of said flexible member, and each said depression penetrating the elastomeric material and creating an indentation in each of said fabric layers which tends to straighten during the movement of said member when its configuration is changed thereby relieving the resulting stresses created in said turnover portion.

41. The fluid spring as claimed in claim 40 wherein the improvement further comprises providing the outer surface of said body with a plurality of closely spaced corrugations in at least the area thereof subjected to dynamic contact with elements of the system during the movement of said member thereby reducing the thickness of said body at spaced intervals to further facilitate the flexing thereof.

42. In a fluid spring of a fluid pressure system, including the combination of:
   A. a flexible, resilient member having;
      1. a hollow body of elastomeric material with at least one layer of textile fabric therein, said body defining at least one toroidal-shaped portion during the operation of the system, and
      2. an essentially inextensible circumferential bead ring at each of the ends thereof;
   B. retaining elements attached to the peripheral edge portions of said member to form a fluidtight chamber capable of supporting a load with said elements adapted for movement relative to each other to cause the configuration of the member to change with such movement thereby resulting in a change of the pressure of the fluid contained in the chamber; and
   C. the improvement comprising, providing said body with a plurality of closely spaced corrugations in at least the area thereof subjected to dynamic contact with elements of the system during the movement of said member thereby reducing the thickness of said body at spaced intervals to further facilitate the flexing thereof.